2 Sheets—Sheet 1.

R. R. MILLER.

Assignor, by mesne assignments, to himself, J. B. SAVAGE & ATWATER MANUFACTURING CO.

Series of Dies for Forming the Heads of King Bolts.

No. 8,694. Reissued May 6, 1879.

WITNESSES:

Jas. E. Hutchinson.

Henry C. Hazard.

INVENTOR.

R. R. Miller, by

Prindle and Lorenz Attys.

2 Sheets—Sheet 2.

R. R. MILLER,

Assignor, by mesne assignments, to himself, J. B. SAVAGE & ATWATER MANUFACTURING Co

Series of Dies for Forming the Heads of King Bolts.

No. 8,694. Reissued May 6, 1879.

WITNESSES:

Jas. E. Hutchinson.

Henry C. Hazard.

INVENTOR.

R. R. Miller, by

Prindle & Lovejoy his Attys

UNITED STATES PATENT OFFICE.

ROBERT R. MILLER, OF PLANTSVILLE, CONNECTICUT, ASSIGNOR, BY MESNE ASSIGNMENTS, TO HIMSELF, J. B. SAVAGE, AND ATWATER MANUFACTURING COMPANY.

IMPROVEMENT IN SERIES OF DIES FOR FORMING THE HEADS OF KING-BOLTS.

Specification forming part of Letters Patent No. 100,053, dated February 22, 1870; Reissue No. 8,694, dated May 6, 1879; application filed March 4, 1879.

*To all whom it may concern:*

Be it known that I, ROBERT R. MILLER, of Plantsville, in the county of Hartford and State of Connecticut, did invent certain new and useful Improvements in Dies for Forming the Heads of King-Bolts, for which Letters Patent No. 100,053 were issued to me upon the 22d day of February, 1870, which Letters Patent have been found defective in that the specification and claims do not cover all of the invention shown and described in the application filed by me upon the 31st day of July, A. D. 1869. Now, therefore, being desirous of reissuing the said Letters Patent, I have prepared and do hereby declare the following to be a full, clear, and exact description of my said invention, reference being had to the accompanying drawings, making a part of this specification, in which—

Figure 1:
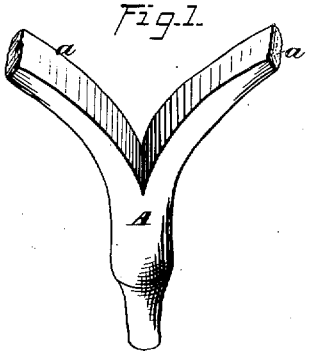
Figure 2:
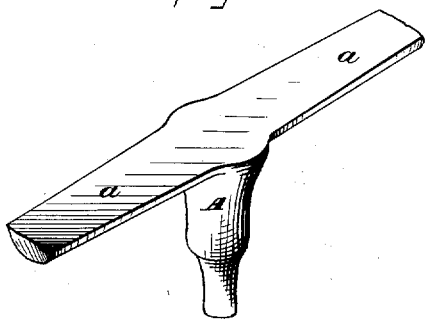
Figure 3:
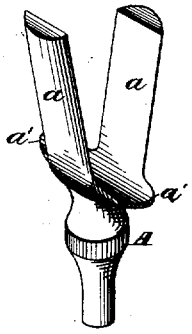
Figure 4:
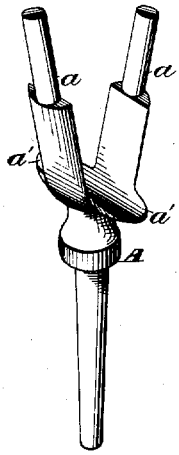
Figure 5:
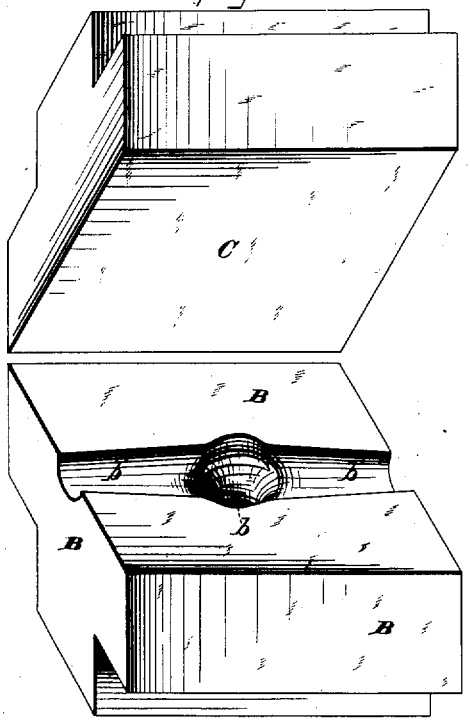
Figure 6:
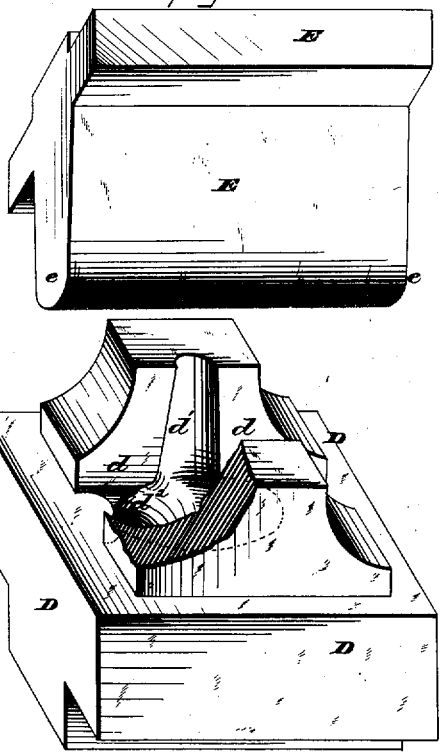
Figure 7:
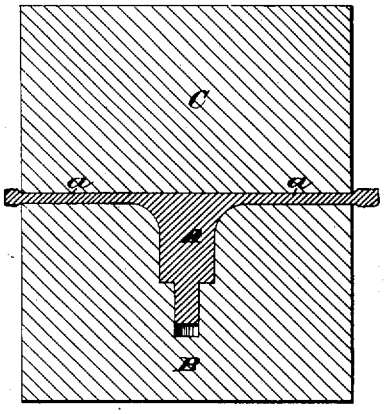
Figure 9:
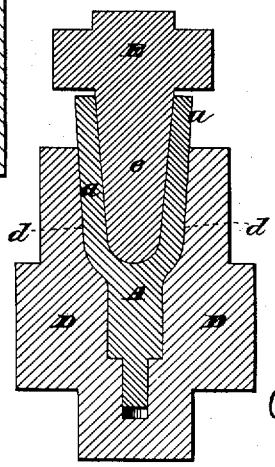
Figure 8:
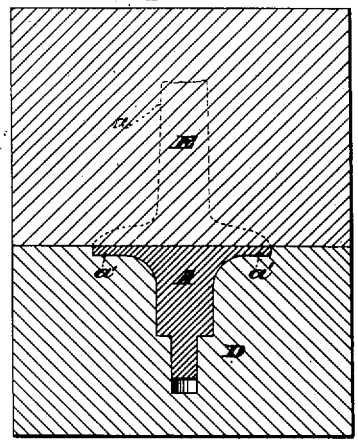

Figure 1 is a perspective view of the blank used in the formation of my king-bolt. Fig. 2 is a like view of the same after passing through the forming-dies. Fig. 3 is a perspective view of said blank after having been operated upon by the bending-dies. Fig. 4 is a like view of the completed king-bolt. Fig. 5 is a perspective view of the dies used for forming the clip-arms, said dies being separated from each other. Fig. 6 is a like view of the dies used for bending said clip-arms to shape. Fig. 7 is a central longitudinal section of said forming-dies as they appear when closed together with a clip-blank within the lower die; and Figs. 8 and 9 are, respectively, longitudinal and cross sections of the bending-dies upon central lines as they appear with the completed king-bolt between their faces.

Letters of like name and kind refer to like parts in each of the figures.

The design of my invention is to enable clip king-bolts to be easily and cheaply made by machinery; to which end it consists, principally, in the forming-dies constructed in the manner substantially as hereinafter shown.

It consists, further, in the series of dies, substantially as and for the purpose hereinafter shown and described.

In the construction of king-bolts I employ a blank, A, which is formed by splitting the end of a metal bar longitudinally for a distance of about two inches, turning the forks or arms *a* outward at substantially a right angle with each other, and then severing said blank from the bar at such distance below said arms as to leave the necessary metal for forming the spindle.

The next operation consists in giving form to the arms *a*, which is accomplished by the following-described means: Within the upper side of a metal block, B, is formed a vertical central opening, *b*, that corresponds in general shape and diameter to the like features of the body of the blank A, and has such depth as may be desired for said part. Extending lengthwise of the block B is a half-round groove, *b'*, which intersects the opening or recess *b*, and has a slightly greater depth at its ends than at its longitudinal center, and a slightly greater width at the latter point than at said ends. At the upper end of said recess *b* the corners are rounded, as shown. The blank A is suitably heated and placed within the die B, its body being within the recess *b* and its arms *a* over the grooves *b'*, after which a plane-faced upper die, C, is caused to impinge one or more times upon said blank until the latter is caused to conform to and fill said recess and groove, said arms being in a line with each other, as seen in Fig. 2. The blank A is now relieved of its projecting fin by any suitable means, after which it is operated upon by a second set of dies, as follows: A block, D, is provided with a U-shaped cavity, *d*, within and extending longitudinally across its upper side, and has at the bottom of such cavity a vertical recess, $d^1$, that corresponds to the size and shape of the body of the blank A. From the recess $d^2$ a groove, $d^1$, extends outward and upward within the sides of the cavity *d*, and has such depth and transverse dimensions and shape as will cause it to conform to the like features of the finished arms *a* of the blank A, said grooves being increased in width at the bottom of said cavity until they extend upon each side of said recess $d^2$ a distance equal to the entire breadth of other portions of said arms. An upper die, E, is provided upon the lower side with a projection, *e*, which corresponds in shape and size to the cavity *d* of the die D and fills the same when said dies are brought together. The blank A is taken as it comes from the die B and placed across the cavity *d* of the die D, the body of said blank being directly over the recess $d^2$, and its arms over and in a line with the grooves $d^1$, after which the die E is caused to strike one or more blows upon said blank, such operation causing the latter to be bent to the form shown in Fig. 3, and the surplus metal at the point where said arms join said body to be thrown outward and form wings or lips *a'*. The king-bolt is completed by drawing out the shank A, and by rounding and threading the ends of the clip-arms *a*, as shown in Fig. 4, any desired or usual means being employed for such purpose.

Having thus fully set forth the nature and merits of my invention, what I claim as new is—

1. The die B *b b'* and the die C, constructed and combined substantially as and for the purpose shown.

2. The series of dies B, C, D, and E for forming clip king-bolts, substantially as shown and described.

In testimony that I claim the foregoing I have hereunto set my hand this 21st day of February, A. D. 1879.

R. R. MILLER.

Witnesses:
GEO. S. PRINDLE,
MARCUS H. HOLCOMB.